May 24, 1960
A. M. MAN
2,937,452
PITCH DIAMETER GAUGE END CAPS
Filed July 27, 1956
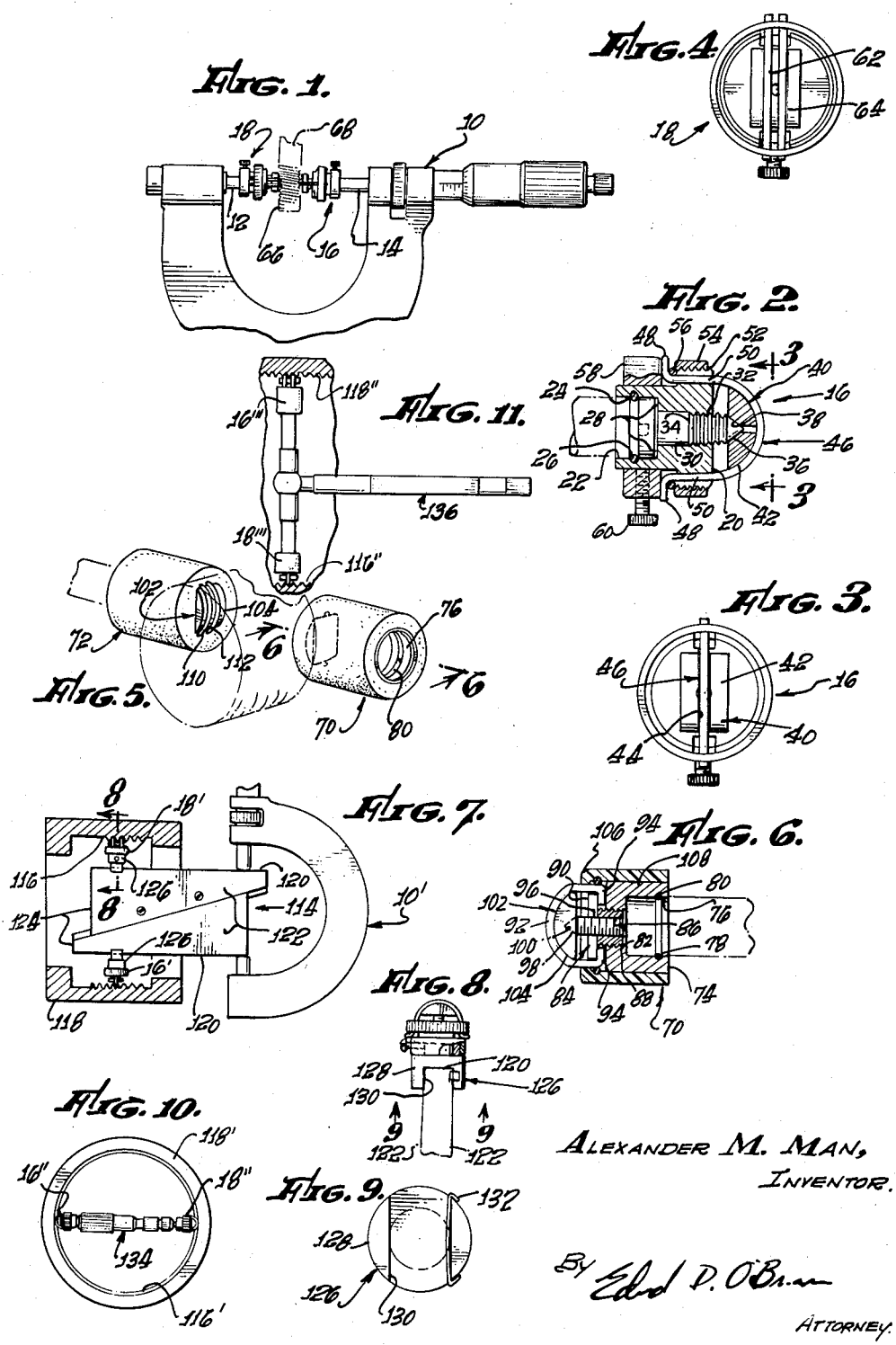
Alexander M. Man,
Inventor.
By Edw. D. O'Brien
Attorney.

United States Patent Office 2,937,452
Patented May 24, 1960

2,937,452

PITCH DIAMETER GAUGE END CAPS

Alexander M. Man, 3456 Carmona Ave., Los Angeles, Calif.

Filed July 27, 1956, Ser. No. 600,452

8 Claims. (Cl. 33—199)

This invention relates to new and improved pitch diameter gauge end caps. More specifically it relates to cap-like structures for use in conjunction with a measuring instrument such as, for example, a micrometer or the like in measuring the pitch diameter of threads upon a threaded member.

In machine work it is frequently necessary to measure the pitch diameter of various threaded members such as, for example, bolts, internally threaded pipe fittings, and the like. Further, such measurements must be comparatively accurate if they are to be used as the basis for further manufacturing of parts or the like. For this general type of purpose several different types of apparatus have been commonly employed. One of these types of apparatus involves the use of separate wires held adjacent to the threads of an externally threaded member. With this type of procedure a micrometer is used to measure the distance between the outside of the wires held on the opposite sides of a threaded member. Obviously a procedure of this category is somewhat cumbersome, and hence, various structures have been developed which are intended to improve upon this type of method.

Various types of screw thread micrometers are frequently utilized in measuring the pitch diameter of threads. Micrometers of this category which are specifically designed for measuring the pitch diameter of screw threads are normally supplied with specially formed swivel anvils and with a pointed movable spindle. Because of certain size aspects included in measuring the pitch diameter of threads no one micrometer of this type can be used with all different sizes of threads. Thus, many machine shops have a set of a comparatively large number of separate micrometers so that the appropriate readings may be taken on any threaded member. This is a very expensive procedure.

A broad object of the present invention is to provide a cap-like structure which can be located upon either an anvil or a movable spindle of a conventional micrometer so that a conventional structure of this category can be easily and conveniently adapted to be used in measuring pitch diameter. Thus, with a set of cap structures as hereinafter described in detail considerable expense can be avoided on the part of a machine shop operator. A further object of this invention is to provide cap structures of this category which are relatively inexpensive, and which are sufficiently accurate for virtually any application known at the present time. Still further objects of the invention are to provide structures for measuring pitch diameter which can be used on other measuring instruments besides micrometers. As an example of this, the structures of the present invention can be employed upon telescoping gauges, with adjustable parallels as well as with micrometers of either the inside or outside variety.

Further objects of this invention as well as many advantages of it will be more fully apparent from the remainder of this description, the appended claims and the accompanying drawing in which:

Fig. 1 is a top elevational view of a micrometer using pitch diameter gauge end caps of the present invention;

Fig. 2 is a cross sectional view of a pitch diameter end gauge cap as shown in Fig. 1;

Figs. 3 and 4 are top elevational views of the pitch diameter end gauge caps shown in Fig. 1, these views being taken in the direction of the arrows 3—3 in Fig. 2;

Fig. 5 is a perspective view illustrating the use of modified pitch diameter gauge end caps of the invention;

Fig. 6 is a cross sectional view taken at line 6—6 of Fig. 5;

Fig. 7 is a side view, partially in section, showing the use of pitch diameter gauge end caps of the invention with adjustable parallels;

Fig. 8 is a cross sectional view along line 8—8 of Fig. 7 showing certain parts in elevation;

Fig. 9 is a cross sectional view taken at line 9—9 of Fig. 8;

Fig. 10 is a view similar to Fig. 7 showing the use of the pitch diameter gauge end caps of the invention with an inside micrometer; and Fig. 11 is a view similar to Fig. 7 showing the use of pitch diameter gauge end caps of the invention with a telescoping gauge.

In all figures of the drawing like numerals are used to designate like parts whenever convenient for purposes of illustration and explanation. It is to be understood that this invention is not to be considered as being limited to cap structures or pitch diameter gauge end caps formed precisely as illustrated inasmuch as the shape and configuration of these end caps may be modified or altered without departing from the essential features of this invention. In some cases it is possible to substitute various structures of an essentially equivalent nature for certain of the parts of these end caps without departing from the true scope of the invention disclosed in the specification.

As an aid to understanding this invention it may be stated in essentially summary form that it involves structures of the class briefly indicated in the preceding, which include a holding member, means for mounting this holding member upon part of a measuring instrument, and a curved wire yoke mounted on the holding member so as to project therefrom with the central portion of the yoke extending from the side of the holding member remote from the means of mounting the holding member. Structures of this category are termed "cap structures" or "pitch diameter gauge end caps" in this specification. These structures are best understood from a detailed consideration of the accompanying drawing.

In Fig. 1 of the drawing there is shown a micrometer 10 having an anvil 12 and a movable spindle 14. Upon these last two parts there are mounted by means more fully described later first and second cap structures 18 and 16, respectively. From a detailed consideration of Fig. 2 of the drawing it will be seen that the cap 16 is built around a cylindrical holding member 20 having an internal cylindrical cavity 22 formed in one end thereof. Around the interior of this cavity 22 there is formed a groove 24 adapted to hold a conventional snap ring 26. This structure is formed so that the cap 18 may be snapped over the anvil 12 and held in this position by means of the snap ring 26. Because of the nature of the snap ring some adjusting of the positioning of the cap 18 upon the anvil 12 occurs during this operation so that the anvil seats against a shoulder 28 marking the end of the cavity 22.

A threaded opening 30 of smaller diameter than the cavity 22 is formed so as to project axially through the holding member 20 from the cavity 22 to the end of this holding member remote from the cavity. A threaded member 32 having a slotted head 34 and a conical, pointed end 36 is threaded within the threaded opening 30 so that the pointed end 36 extends beyond the holding member 20 and fits within a correspondingly shaped opening 38 within the center of a positioning member 40. This positioning member is thus normally spaced away from the holding member 20 by means of the threaded member 32; it is provided with an external surface 42 having the shape of part of the surface of a cylinder. A small groove 44 is provided in the surface 42 so as to extend around it in the manner shown in order to aid in positioning a wire yoke 46. Practically all of the wire yoke 46 extends beyond the groove 44.

The ends 48 of the yoke 46 are bent over so as to extend outwardly, and the portions of the yoke adjacent to these ends extend through slots 50 formed in a threaded exterior flange 52 formed on the holding member 20. These slots 50 are preferably within the same plane, and this plane passes through the axis of the holding member 20. With this construction the yoke 46 may be held against movement away from the holding member 20 by means of a retaining band 54 which is threaded upon the flange 52. If desired, a small ring 56 may be located between the retaining band and the ends 48 of the yoke 46 so as to distribute pressure equally upon the ends 48 and so as to prevent abnormal force from being applied to them as the retaining band 54 is tightened upon the flange 52. Normally the ends 48 are held against a small collar 58 positioned around the holding member 20 by means of this retaining band 54. The position of the collar with respect to the holding member 20 may be adjusted slightly by means of a set screw 60.

The second end cap 18 is formed identically to the cap 16 except for the fact that two yokes 62 and 64 are used instead of a single yoke 46 as previously described, and except for the fact that two grooves are employed instead of a single groove 44 previously described. If desired, either or both of these grooves or the groove 44 may be dispensed with, although this normally is not preferred inasmuch as it makes the assembly of the caps 16 and 18 somewhat more difficult because of alignment problems. Preferably the yokes 46, 62 and 64 are all formed out of wire having a uniform circular cross sectional configuration.

In use the end caps 16 and 18 are located upon the anvil 12 and the spindle 14 of the micrometer 10 as indicated in the preceding discussion and this micrometer is adjusted so that the yokes 46, 62 and 64 fit within threads 66 on a threaded member 68. Preferably the wires used in forming the yokes are of such a dimension as to engage the threads at the pitch diameter of the threads themselves. Thus, when the micrometer 10 is properly adjusted a reading may be obtained on this instrument corresponding to the pitch diameter of the thread 66. This reading may then be corrected in an amount corresponding to the dimensions of the caps 16 and 18 so as to determine the actual pitch diameter of the threads being measured.

One important feature of the caps 16 and 18 lies in the manner in which they are constructed so that different yokes formed of different diameter wire may be substituted for those shown by merely unscrewing the band 54 and adjusting the position of the collar 58. Such different yokes can be of such wire diameter as to be used for measuring the pitch diameter of different sized threads. Preferably with each set of yokes a corresponding set of positioning members is supplied. Such yokes in a set may be loosely attached by any obvious means to the corresponding positioning member to prevent them from being lost. Thus, the caps 16 and 18 can be supplied by a manufacturer with a set of measuring means so that any common micrometer can be used to measure threads of any pitch diameter.

In Fig. 5 of the drawing there are shown modified end caps 70 and 72 of the invention which are adapted to fit upon the anvil and the spindle of a micrometer or similar instrument so as to be used in the same manner as caps 16 and 18 previously described. The cap 70 (Fig. 6) which includes a cylindrical holding member 74 has a cylindrical cavity 76 formed in one end thereof. A continuous groove 78 extends around the interior of the cavity 76 and a small snap ring 80 is positioned within the groove 78 for the same purpose as the snap ring 26. A threaded opening 82 of smaller diameter than the cavity 76 extends along the axis of the holding member 74 so as to project through this holding member.

A retaining member 84 having a threaded passage 86 extending completely therethrough is held within the threaded opening by means of a threaded stud 88. The passage 86 extends through the stud 88; and a small flange 90 is formed on the exterior of the retaining member 84 so as to be spaced from the holding member 74. Thus, with this structure, a small wire yoke 92 similar to the yoke 46 previously described can be held so that inwardly bent ends 94 of this yoke are secured between the retaining member 84 and the holding member 74. A threaded member 96 having a pointed end 98 extends through the threaded opening 82 so that this pointed end fits within a correspondingly shaped opening 100 in a positioning member 102 similar to the positioning member 40 previously described. A curved, cylindrical surface 104 of this positioning member 102 bears against the yoke 92 so as to hold this yoke rigidly in position.

If desired, grooves (not shown) similar to the groove 44 previously described can be located upon the surface 104, although this is not considered necessary. With this structure the holding member 74, the retaining member 84 and the extremities of the yoke 92 are encased within a plastic housing 106 so as to prevent tampering with the structure. This housing may be formed out of any convenient, suitable plastic. This housing serves to prevent heat traveling from the hand to the actual gauging element or yoke 92, affecting the accuracy of the instrument. If desired, a groove 108 may be located in the outside of the holding member 74 so as to aid in retaining the housing 106 in position.

The cap 72 is formed identically with the cap 70 shown in Fig. 6, but differs from it in that two yokes 110 and 112 are utilized. These yokes are, of course, spaced parallel to one another in the same manner as the yokes 62 and 64 are located with respect to one another. The caps 70 and 72 differ from the caps 16 and 18 previously described in that they are only usable with threads having a given pitch diameter corresponding to the dimension of the wires employed in them for the yokes. Thus, these modified caps are preferably supplied by a manufacturer in the form of a set of complete caps for use with threads of different pitch diameters.

Either of the cap structures described can be employed in any of the manners indicated in the Figs. 7-11 of the drawings. For convenience of explanation and illustration the caps 16 and 18 have been illustrated in these figures. In Fig. 7 caps 16' and 18' are shown being used with adjustable parallel 114 in measuring the pitch diameter of internal threads 116 upon a threaded member 118. In order to mount these caps upon flat tops 120 and parallel flat sides 122 of the pieces or parts 124 of the adjustable parallel 114, small adapters 126 are employed. These adapters are preferably formed so as to have a central member 128 having a slot 130 located in an end thereof. The slots 130 each have a flat top and flat sides, and are wider than the piece 124 of the adjustable parallel 114 upon which they are to be mounted. A small leaf spring 132 is crimped along the sides of the central member 128 so as to project through the slot 130 so as to normally bear against one side 122, holding the piece 124 and the adapter 126 firmly against one another.

When the caps 16' and 18' have been mounted in the manner shown by means of the adapters 126, the adjustable parallel 114 may be actuated so that these caps are in contact with the internal threads 116, and a measurement may be obtained through the use of a micrometer 10' across the adjustable parallel 114 corresponding to the pitch diameter of the threads 116. This measurement may then be corrected by an amount corresponding to the dimensions of the adapters 126 and the caps 16' and 18' so as to obtain the actual pitch diameter.

End caps such as previously described may also be mounted in the obvious manner upon projecting anvils and movable spindles of internal micrometers. Thus in Fig. 10 two end caps of the invention 16'' and 18'' are shown as mounted in the manner previously described upon an internal micrometer 134 for use in measuring the pitch diameter of internal threads 116' upon a threaded member 118'. Such caps 16''' and 18''' may also be mounted in a similar manner upon a telescoping gauge 136 of conventional construction for measuring the pitch diameter of internal threads 116'' upon a threaded member 118'' as shown in Fig. 11. A telescoping gauge of this category can be screwed out of the threaded member once a desired setting has been achieved.

Those skilled in the art to which this invention pertains will realize from the foregoing, and from a thorough consideration of the accompanying drawings that the present invention has many advantages of a commercial category. Because of the nature of the invention it is susceptible to modification of a routine engineering nature, and, hence, is to be limited only by the appended claims.

I claim:

1. A structure of the class described which comprises: a cylindrical holding member; means defining a cylindrical cavity within one end of said holding member, said cavity being adapted to contain part of a measuring instrument; means for securing said holding member upon said part of said measuring instrument, said means for securing being capable of extending into said cavity; means defining a threaded opening extending axially through said holding member from said cavity; a threaded member positioned within said threaded opening so as to extend from the end of said holding member remote from said means defining a cavity; a member having a curved exterior surface positioned against said threaded member so as to be held away from said holding member; a wire yoke positioned so as to extend from along said holding member over said curved surface; and means for attaching said wire yoke to said holding member.

2. A structure of class described which comprises: a cylindrical holding member; means defining a cylindrical cavity within one end of said holding member; said cavity being adapted to contain part of a measuring instrument; means defining a groove extending around the exterior of said cavity within said holding member; a snap ring located within said groove so as to extend into said cavity; means defining a threaded opening of smaller diameter than said cavity extending through said holding member; a threaded member having a pointed end, said threaded member being positioned within said threaded opening so that said pointed end projects from said holding member; a positioning member having an external surface having a shape of part of a right circular cylinder and having a pointed opening on the side thereof remote from said surface positioned so that said pointed opening is located against said pointed end of said threaded member, a wire yoke positioned over said surface and extending along portions of said holding member; and means for holding said wire yoke in a fixed position.

3. A structure of the class described which comprises: a cylindrical holding member; means defining a cylindrical cavity within one end of said holding member, said cavity being adapted to contain part of a measuring instrument; means defining a groove extending around the exterior of said cavity within said holding member; a snap ring located within said groove so as to extend into said cavity, said snap ring being designed to engage said part of a measuring instrument so as to hold said part with respect to said holding member; means defining a collar positioned around the exterior of said holding member at the end thereof adjacent to said cavity; means for securing said collar to the exterior of said holding member; means defining a threaded exterior flange located around said holding member adjacent to the end thereof remote from said cavity; means defining slots parallel to the axis of said holding member and located on opposite sides of the axis of said holding member and extending through said threaded flange, means defining a threaded opening of smaller diameter than said cavity extending through said holding member along the axis of said holding member from said cavity to the end of said holding member remote from said cavity; a threaded member having a pointed end positioned within said threaded opening so that said threaded end projects from the end of said holding member remote from said cavity; a positioning member having an exterior surface of the shape of a part of rgiht circular cylinder and having a pointed opening therein on the side thereof remote from said surface positioned so that said pointed opening is located against said pointed end of said threaded member; a wire yoke having bent-over outwardly extending ends, said yoke being formed of a circular wire and being positioned over said surface and extending through said slots so that said bent-over ends are located between said collar and said flange on said holding member; and a retaining band having a threaded interior positioned on said threaded flange so that said retaining band engages said bent-over ends of said wire yoke, holding said wire yoke in a fixed position.

4. A structure as defined in claim 3 including: means positioned on said exterior surface for holding said wire in a given position upon said positioning member.

5. A structure of the class described which comprises: a cylindrical holding member; means defining a cylindrical cavity within said holding member; means defining a groove extending around the exterior of said cavity within said holding member; a snap ring located within said groove so as to extend into said cavity; means defining a threaded opening of smaller diameter than said cavity extending from said cavity into said holding member; a retaining member having a threaded passage formed in the center thereof and having a threaded stud attached thereto, said stud being positioned in said threaded opening, said passage extending through said stud; a wire yoke having inwardly extending bent-over ends positioned on said holding member so as to extend therefrom with said bent-over ends being held between said retaining member and said holding member; a threaded member having a pointed end positioned so as to extend through said threaded passage within said retaining member with said pointed end projecting from said retaining member and said holding member; and a positioning member having an exterior surface of the shape of part of right circular cylinder and having a pointed opening therein on the side thereof remote from said surface positioned so that said pointed opening is located against said pointed end of said threaded member and so that said surface engages said wire yoke holding said wire yoke in position.

6. A structure as defined in claim 5 including: a plastic housing encasing the ends of said wire yoke, said retaining member and exterior of said holding member.

7. A structure of the class described which comprises: an elongated holding member; means for mounting said holding member upon part of a measuring instrument; a member having a curved exterior surface positioned adjacent to said holding member so that said exterior surface is located away from said holding member; means for positioning said member away from said holding member; a wire yoke positioned so as to extend from along said holding member over said curved surface of said member; and means for attaching said wire yoke to said holding member.

8. A structure of the class described which comprises: an elongated cylindrical holding member; means for securing one end of said holding member to a measuring instrument; means defining a threaded opening extending axially through said holding member from said end of said holding member; a threaded member positioned within said threaded opening so as to extend from the end of said holding member remote from said means for securing said holding member to a measuring instrument; a member having a curved exterior surface positioned against said threaded member so as to be held away from said holding member; a wire yoke positioned so as to extend along said holding member over said curved surface; and means for attaching said wire yoke to said holding member.

References Cited in the file of this patent

UNITED STATES PATENTS

| | | |
|---|---|---|
| 1,921,899 | Webbeking | Aug. 8, 1933 |
| 2,471,684 | Hastings | May 31, 1949 |
| 2,557,702 | Soukup et al. | June 19, 1951 |
| 2,692,438 | Schneider | Oct. 26, 1954 |

FOREIGN PATENTS

| | | |
|---|---|---|
| 216,443 | Switzerland | Dec. 1, 1941 |
| 859,810 | Germany | Dec. 15, 1952 |